United States Patent
Kim et al.

(10) Patent No.: US 10,616,956 B2
(45) Date of Patent: Apr. 7, 2020

(54) HEATING ELEMENT INCLUDING NANO-MATERIAL FILLER

(71) Applicant: SAMSUNG ELECTRONICS CO., LTD., Suwon-si, Gyeonggi-do (KR)

(72) Inventors: Seyun Kim, Seoul (KR); Soichiro Mizusaki, Suwon-si (KR); Haengdeog Koh, Hwaseong-si (KR); Doyoon Kim, Hwaseong-si (KR); Hajin Kim, Hwaseong-si (KR); Changsoo Lee, Seoul (KR); Intaek Han, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 20 days.

(21) Appl. No.: 15/374,273

(22) Filed: Dec. 9, 2016

(65) Prior Publication Data

US 2017/0171916 A1 Jun. 15, 2017

(30) Foreign Application Priority Data

Dec. 9, 2015 (KR) .................. 10-2015-0175347
Oct. 25, 2016 (KR) .................. 10-2016-0139285

(51) Int. Cl.

| | |
|---|---|
| H05B 3/18 | (2006.01) |
| H05B 3/14 | (2006.01) |
| H05B 3/12 | (2006.01) |
| H05B 3/26 | (2006.01) |
| C23D 5/02 | (2006.01) |
| C23D 7/00 | (2006.01) |
| F24C 7/04 | (2006.01) |
| H05B 3/20 | (2006.01) |

(52) U.S. Cl.
CPC .............. *H05B 3/12* (2013.01); *C23D 5/02* (2013.01); *C23D 7/00* (2013.01); *F24C 7/04* (2013.01); *H05B 3/141* (2013.01); *H05B 3/20* (2013.01); *H05B 3/262* (2013.01); *H05B 2203/013* (2013.01); *H05B 2203/032* (2013.01); *H05B 2214/04* (2013.01)

(58) Field of Classification Search
CPC . F24C 7/04–7/06; H05B 2203/009–2203/013; H05B 3/14–3/18
See application file for complete search history.

(56) References Cited

U.S. PATENT DOCUMENTS

| | | | |
|---|---|---|---|
| 4,031,353 A | 6/1977 | Rueda Segura | |
| 5,493,102 A | 2/1996 | Takase et al. | |
| 6,265,333 B1 | 7/2001 | Dzenis et al. | |

(Continued)

FOREIGN PATENT DOCUMENTS

| | | |
|---|---|---|
| CN | 102761994 | 10/2012 |
| CN | 102761994 A | 10/2012 |

(Continued)

OTHER PUBLICATIONS

Partial European Search Report issued by the European patent Office, dated Apr. 13, 2017.

(Continued)

*Primary Examiner* — Michael A Laflame, Jr.
(74) *Attorney, Agent, or Firm* — Cantor Colburn LLP

(57) ABSTRACT

A heating element includes a matrix material and a nanomaterial filler, wherein the nanomaterial filler includes at least one of a nano-sheet and a nanorod.

28 Claims, 8 Drawing Sheets

(56) References Cited

U.S. PATENT DOCUMENTS

| | | |
|---|---|---|
| 9,096,431 B2 | 8/2015 | Wee et al. |
| 2004/0191160 A1 | 9/2004 | Takasu et al. |
| 2005/0011882 A1 | 1/2005 | Kim |
| 2009/0194525 A1 | 8/2009 | Lee et al. |
| 2009/0272728 A1 | 11/2009 | Abbott |
| 2010/0102052 A1 | 4/2010 | Boardman |
| 2010/0122980 A1 | 5/2010 | Wang et al. |
| 2012/0132644 A1 | 5/2012 | Gu et al. |
| 2014/0353303 A1 | 12/2014 | Fudo et al. |
| 2015/0114952 A1 | 4/2015 | Tai et al. |
| 2015/0312967 A1* | 10/2015 | Qian .................. H05B 3/84 219/203 |
| 2017/0171916 A1 | 6/2017 | Kim et al. |

FOREIGN PATENT DOCUMENTS

| | | |
|---|---|---|
| EP | 2048912 A1 | 4/2009 |
| JP | 201154696 A | 3/2011 |
| KR | 100749886 B1 | 8/2007 |
| KR | 1020090094548 A | 9/2009 |
| KR | 101082932 B1 | 11/2011 |
| KR | 101209284 B1 | 11/2012 |
| KR | 101316935 B1 | 10/2013 |
| KR | 101330077 B1 | 11/2013 |
| KR | 101528487 B1 | 6/2015 |
| KR | 101613503 B1 | 4/2016 |
| WO | 2015004852 A1 | 1/2015 |

OTHER PUBLICATIONS

Extended Search Report issued by the European Patent Office dated Aug. 10, 2017.

Non-Final Office Action dated Nov. 5, 2019 in U.S. Appl. No. 15/680,830.

\* cited by examiner

HEATING ELEMENT INCLUDING NANO-MATERIAL FILLER

CROSS-REFERENCE TO RELATED APPLICATIONS

This application claims priority to and the benefit of Korean Patent Application Nos. 10-2015-0175347, filed on Dec. 9, 2015, and 10-2016-0139285, filed on Oct. 25, 2016, in the Korean Intellectual Property Office, the disclosures of which are incorporated herein by reference in their entirety.

BACKGROUND

1. Field

The present disclosure relates to heating elements, and more particularly, to heating elements including nanomaterial fillers, apparatuses including the heating element, and methods of manufacturing the heating element.

2. Description of the Related Art

A heating element may be classified as an organic heating element including carbon as a main element, such as graphite, carbon nanotube, carbon black, etc.; a metal heating element including a metal, such as Ag, Ni—Cr group, Mo, W, etc.; and a ceramic heating element including a ceramic, such as silicon carbide, molybdenum silicide, etc. The heating element may be further classified as a rod type heating element having a rod shape and a roll type heating element in which a heating element in the form of a thick film is placed on a substrate. The organic heating element may be easily and inexpensively manufactured, but high temperature durability thereof is relatively low since the organic material reacts with oxygen at a high temperature. The metal heating element has high electrical conductivity and may be easily controlled, and thus, the heat generating characteristics thereof are good. However at high temperatures, the metal of the metal heating element may be oxidized, and thus, the heat generating characteristics thereof may be reduced. The ceramic heating element has a low level of reactivity with oxygen, and thus has high temperature durability over an extended period of time, but the electrical conductivity thereof is relatively low compared to the metal heating element. In addition, ceramic is sintered at a high temperature. The rod type heating element is easily manufactured, but maintaining a temperature in cavities thereof is difficult. However, in the roll type heating element, the whole roll may generate heat, and thus a temperature in the cavities thereof may be uniformly maintained.

SUMMARY

Provided is a heating element having high heat generation characteristics due to increased electrical conductivity.

Provided is a method of manufacturing the heating element at a relatively lower sintering temperature through improved processability.

Provided is an apparatus having increased heat generation efficiency by including the heating element.

According to an aspect of an embodiment, a heating element includes a matrix material; and a nanomaterial filler, wherein the nanomaterial filler includes at least one of a nano-sheet and a nano-rod.

The matrix material may include at least one of a glass frit and an organic material.

The glass frit may include at least one of silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, and sodium oxide.

The glass frit may include silicon oxide and an additive, and the additive may include at least one of Li, Ni, Co, B, K, Al, Ti, Mn, Cu, Zr, P, Zn, Bi, Pb, and Na.

The organic material may be an organic polymer.

The organic polymer may include at least one of a polyimide (PI), polyphenylenesulfide (PPS), polybutylene terephthalate (PBT), polyamideimide (PAI), liquid crystalline polymer (LCP), polyethylene terephthalate (PET), polyetherketone (PEK), and polyetheretherketone (PEEK).

The nanomaterial filler may include at least one of an oxide, a boride, a carbide, and a chalcogenide.

The nanomaterial filler may have a thickness in a range from about 1 nanometer (nm) to about 1,000 nm.

The nanomaterial filler may have a length in a range from about 0.1 micrometer (μm) to about 500 μm.

The content of the nanomaterial filler in the heating element may be in a range from about 0.5 volume percent (vol %) to less than 100 vol %.

The nanomaterial filler may have an electrical conductivity of at least about 1,250 Siemens per meter (S/m).

According to an aspect of an embodiment, a method of manufacturing a heating element includes mixing a nanomaterial filler with a matrix material to form a mixture of the nanomaterial filler and the matrix material; coating the mixture of the nanomaterial filler and the matrix material on a substrate to form a coating on the substrate; and heat treating the coating on the substrate to provide the heating element, wherein the nanomaterial is at least one of a nano-sheet and a nano-rod.

The method can further comprise manufacturing of the nanomaterial filler, including forming an aqueous solution including a nanomaterial, calculating a concentration of the nanomaterial in the aqueous solution; measuring a volume of the aqueous solution so that the aqueous solution includes a desired weight of the nanomaterial; and removing a solvent from the measured aqueous solution to provide the nanomaterial filler.

The heat treating of the mixture coated on the substrate may include drying the mixture coated on the substrate; and sintering the dried resultant product.

The substrate may have a composition that is the same as or different from a composition of the matrix material.

The substrate may be a silicon wafer or a metal substrate.

The coating may include at least one of a screen printing method, an ink jet method, a dip coating method, a spin coating method, or a spray coating method.

According to an aspect of an exemplary embodiment, an apparatus includes a heating element module including the heating element as described above.

The apparatus may further include at least one of an adiabatic member and a thermal reflection member on a side of the heating element.

The heating element may be provided as a heat source to supply heat to a region inside the apparatus.

Also, the heating element may be provided as a heat source to supply heat to a region on an outside of the apparatus.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects, advantages, and features of this disclosure will become apparent and more readily appreciated from the following description of the embodiments, taken in conjunction with the accompanying drawings in which.

DETAILED DESCRIPTION

Figure 1:
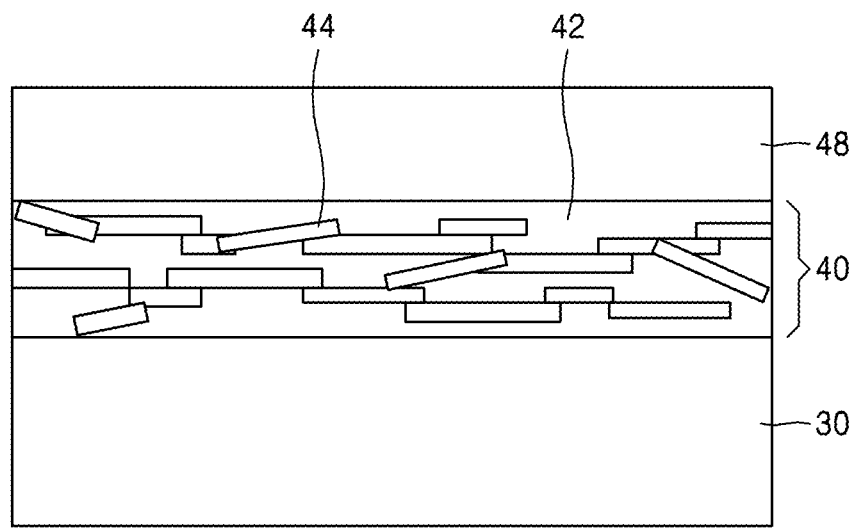
FIG. 1 is a schematic cross-sectional view of a heating element including a nanomaterial filler according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the context clearly indicates otherwise. "At least one" is not to be construed as limiting to "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "nanomaterial" refers to a material having a least one dimension (e.g. a diameter or a thickness) which is on a nanoscale level, i.e., a dimension of less than about 1000 nanometers, or about 1 nm to about 1000 nm.

As used herein, the term "nano-rod" refers to a material having a rod shape and which has at least one dimension (e.g. a diameter) in a range of less than about 1000 nanometers, or about 1 nm to about 1000 nm, and an aspect ratio of 3 to 5.

As used herein, the term "nano-sheet" refers to a material having a two-dimensional structure in the form of a sheet and which has a thickness of less than about 1000 nanometers, or a thickness in a range of about 1 nm to about 1000 nm.

When a sheet type heating element, i.e., a heating element in the form of a sheet, is manufactured, a glass frit that forms a matrix material and a filler that may generate heat are mixed together to form a composite. In this case, the individual filler particles are connected to each other in order to be electrified, and thus, heat may be generated. When a heating element uses a ceramic material as filler, in the related art, the filler particles may have a shape in the form of a sphere or a three dimensional polyhedron structure. For example, $RuO_2$ particles having a sphere or polyhedron shape may be used as filler. When these types of $RuO_2$ particles are used, theoretically percolation between $RuO_2$ particles may be possible when an entire surface of glass frit particles are covered by the $RuO_2$ particles, and thus, stable heat generation may be accomplished.

However, when the $RuO_2$ particles having a sphere or a polyhedron shape are used as a filler, a contact area between the $RuO_2$ particles is small, and thus, a high temperature may be needed to effect sintering, and the amount of $RuO_2$ particles to be percolated in the matrix material may be increased.

The heating element according to an exemplary embodiment herein is a sheet type heating element, and includes a nanomaterial filler. Accordingly, a percolation network is easily established and a sintering temperature may be reduced as compared to when a filler of the related art having particles in the shape of a sphere or a polyhedron is used. A nano-sheet may be used as an example of the nanomaterial filler. A small amount of the nano-sheets may cover a surface of a matrix material and adjacent nano-sheets may form a surface-contact, and thus, sinterability of the heating element is increased. The same principles may apply to use of a nanorod.

Due to the characteristics described above, when a nanomaterial filler is used, electrical conductivity is increased as compared to $RuO_2$ particles of the related art as filler, even when the same amounts of each filler are used.

Hereinafter, a heating element that includes a nanomaterial filler, an apparatus including the heating element, and a method of manufacturing the heating element will be described in detail with reference to the accompanying drawings. In the drawings, the thicknesses of regions and layers may be exaggerated for clarity.

FIG. 1 is a schematic cross-sectional view of a heating element including a nanomaterial filler according to an embodiment.

Referring to FIG. 1, a heating element 40 is formed on a substrate 30. The substrate 30 may include a single layer or a plurality of layers. The heating element 40 may be formed on the substrate 30 through a series of processes, for example, a coating process and a drying process. The heating element 40 may generate heat by energy supplied by a source external to the heating element (e.g. from the outside). The energy supplied by the external source may be, for example, electrical energy, but any energy that may be applied to the heating element 40 to facilitate heat generation may be used. A whole body that includes the substrate 30 and the heating element 40 may be referred to as a heating element module.

The heating element 40 may include a matrix material 42 and a nanomaterial filler 44. As an example, the heating element 40 may consist essentially of, or consist of, the matrix material 42 and the nanomaterial filler 44. Alternatively, the heating element 40 may further include other components together with the matrix material 42 and the nanomaterial filler 44. The nanomaterial filler 44 may include a plurality of nanomaterials. Some of the horizontally and/or vertically adjacent nanomaterials may be in direct contact with each other, and at least some regions of the adjacent nanomaterials may be in surface-contact with each other. In this manner, the plurality of nanomaterials that are uniformly distributed in the matrix material 42 may be electrically connected to each other and as a result, the heating element 40 may be electrically conductive. Since neighboring nanomaterials of the nanomaterial filler 44 are in surface-contact with each other, the electrical conductivity of the heating element 40 may be easily increased when compared to a particulate filler including a plurality of particles having a sphere or a polyhedron shape. Accordingly, the electrical conductivity of the heating element 40 may be greater than a heating element that uses a particulate filler, if the amount of the nanomaterial filler 44 distributed in the matrix material 42 is the same amount as the particulate filler.

The matrix material 42 and the nanomaterial filler 44 may form a heating element 40 having a single layer by mixing the matrix material 42 and the nanomaterial filler 44 with each other. An upper layer 48 may be formed on the heating element 40. The upper layer 48 may include a single layer or a plurality of layers. A whole body that includes the substrate 30, the heating element 40, and the upper layer 48 may be referred to as a heating element module.

In an embodiment, the matrix material 42 may include a glass frit. The glass frit may include at least one oxide, for example silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, and sodium oxide. The glass frit may also include an additive. The additive may include at least one of Li, Ni, Co, B, K, Al, Ti, Mn, Cu, Zr, P, Zn, Bi, Pb, and Na. However, the additives are not limited to these materials. In an embodiment, the glass frit includes silicon oxide and at least one additive.

In another embodiment, the matrix material 42 may include an organic material having a heat-resistance property. For example, the matrix material 42 may include an organic polymer. The organic polymer may have a melting point (Tm), for example, of greater than 200° C. The organic polymer may be one of polyimide (PI), polyphenylene sulfide (PPS), polybutylene terephthalate (PBT), polyamideimide (PAI), liquid crystalline polymer (LCP), polyethylene terephthalate (PET), polyetherketone (PEK), and polyetheretherketone (PEEK).

The composition of the substrate 30 may be the same as or different from the composition of the matrix material 42. For example, the substrate 30 may include at least one oxide selected from silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, and sodium oxide.

As another example, the composition of the substrate 30 may include a different material from the materials that are used to form the matrix material 42. For example, the substrate 30 may be a silicon wafer, a metal substrate, or another conductive substrate.

Figure 2:
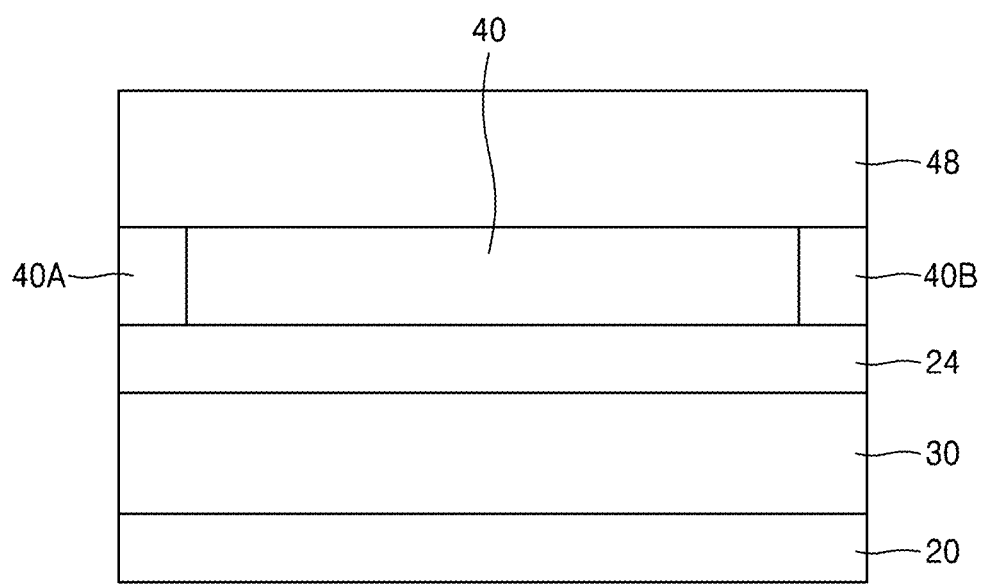
FIG. 2 is a cross-sectional view of the heating element of FIG. 1 including an insulating layer between a substrate and a heating element.

When the substrate 30 is a conductive substrate, as depicted in FIG. 2, an insulating layer 24 may further be provided between the heating element 40 and the substrate 30. Also, an additional insulating layer 20 may further be provided on a lower surface of the substrate 30. The insulating layers 20 and 24 may include an oxide glass layer. The oxide glass layer may include at least one of silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, and sodium oxide. The oxide glass layer may include an enamel layer. The insulating layers 20 and 24 may be the same oxide glass layer or may different oxide glass layers.

In FIG. 2, reference numerals 40A and 40B are first and second electrodes respectively attached to opposite ends of the heating element 40. Electricity may be supplied to the heating element 40 through the first and second electrodes 40A and 40B. In FIG. 2, not only the element indicated by reference numeral 40 but also a whole body depicted in FIG. 2 may be referred to as a heating element module.

The nanomaterial filler 44 may be a filler including a nanomaterial. The nanomaterial may be at least one of a nano-sheet and a nano-rod. For example, the nanomaterial filler 44 may be a nano-sheet type filler or nano-rod type filler. The nano-sheet type fillers and the nano-rod type fillers may include nano-sheets and nano-rods, respectively. The nano-sheets and nano-rods may include various materials and may have a composition which is electrically conductive. For example, the nano-sheets and nano-rods may have an electrical conductivity of at least about 1,250 S/m). However, in some cases, the electrical conductivity of the nano-sheets or nano-rods may be slightly greater or smaller than the given electrical conductivity.

In an embodiment, the nanomaterial filler may have an electrical conductivity of at least about 1,250 S/m, or at least about 5,000 S/m, or at least about 10,000 S/m.

The nanomaterial filler may include at least one of an oxide, a boride, a carbide, and a chalcogenide.

An oxide used as the nanomaterial filler may include, for example, at least one of $RuO_{(2+x)}$ where $0 \leq x \leq 0.1$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, and $RhO_2$.

A boride used as the nanomaterial filler may include, for example, at least one of $Ta_3B_4$, $Nb_3B_4$, $TaB$, $NbB$, $V_3B_4$, and $VB$.

A carbide used as the nanomaterial filler may include, for example, at least one of $Dy_2C$ and $Ho_2C$.

A chalcogenide used as the nanomaterial filler may include, for example, at least one of $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, and $CeTe_2$.

The nanomaterial filler may have a thickness in a range from about 1 nm to about 1,000 nm, or from about 10 nm to about 1,000 nm, or from about 10 nm to about 500 nm. The nanomaterial filler may have a length in a range from about 0.1 μm to about 500 μm, or from about 0.2 μm to about 300 μm, or from about 1 μm to about 250 μm. The content of the nanomaterial filler in the heating element may be in a range from about 0.1 vol % to about less than 100 vol %, or from about 1 vol % to about 75 vol %, or from about 5 vol % to about 50 vol %, based on a total weight of the heating element.

Figure 3:
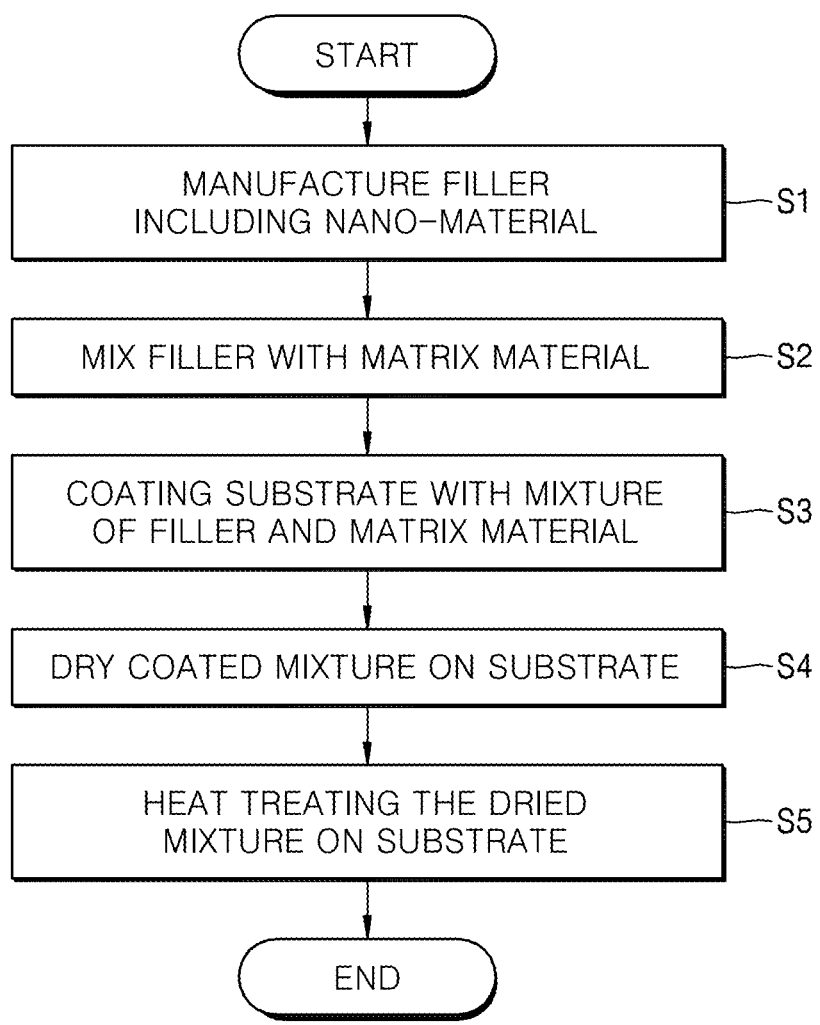
FIG. 3 is a flowchart of a method of manufacturing a heating element including a nanomaterial filler according to an embodiment.

Next, a method of manufacturing a heating element including a nanomaterial filler will be described with reference to FIG. 3. As an example, a heating element that includes a nanomaterial filler of 10 wt % will be described. It is to be understood that the nanomaterial filler may be obtained from another source, e.g., purchased, or prepared as described below.

1) Manufacture of Filler Including a Nanomaterial (S1)

An $RuO_{(2+x)}$ nano-sheet, where $0 \leq x \leq 0.1$, as an example of a filler including a nanomaterial is manufactured. Fillers including other types of nanomaterials may also be manufactured using a method which is substantially the same as or similar to the method used to form the $RuO_{(2+x)}$ nano-sheet, where $0 \leq x \leq 0.1$.

In order to manufacture the $RuO_{(2+x)}$ nano-sheet, $K_2CO_3$ is mixed with $RuO_2$ in a molar ratio of 5:8 to form a mixture, and the mixture is formed as pellets. The pellets are placed in an aluminum crucible, and heat treated for 12 hours at a temperature of 850° C. in a tube furnace. The heat treatment may be performed under a nitrogen atmosphere. A weight of each pellet is in a range from about 1 gram (g) to about 20 g. However, the weight of the pellet may vary based upon the starting amount of each material. The shape of the pellet may be a disc shape.

After heat treatment of the pellet, when the temperature of the tube furnace is cooled down to room temperature, the alumina crucible is removed from the tube furnace and the pellet is ground to a powder.

Next, after washing the powder with about 100 milliliters (mL) to about 4 liters (L) of water for 24 hours, the powder is separated by filtering. At this point, the powder has a composition of $K_{0.2}RuO_{2.1} \cdot nH_2O$.

Next, the $K_{0.2}RuO_{2.1} \cdot nH_2O$ powder is immersed in 1 molar (M) HCl and stirred for 3 days at room temperature. Afterwards, the powder is recovered by filtering the mixture. The composition of the powder obtained in this process is $H_{0.2}RuO_{2.1}$.

Figure 4:
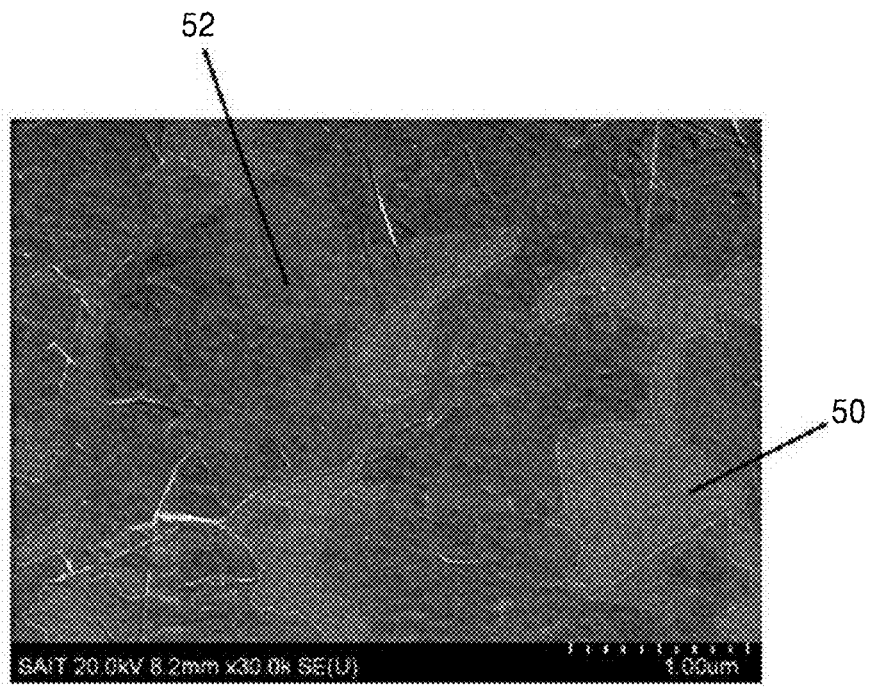
FIG. 4 is a scanning electron microscope (SEM) image of an exfoliated $RuO_{(2+x)}$ nano sheet ($0 \le x \le 0.1$) formed in a method of manufacturing a heating element according to an embodiment.

Next, 1 g of $H_{0.2}RuO_{2.1}$ powder is immersed in 250 mL of an aqueous solution in which an intercalant, such as tetramethylammonium hydroxide (TMAOH) and tetrabutylammonium hydroxide (TBAOH) are mixed, and the mixture is stirred for more than 10 days at room temperature. At this point, the concentration of the TMAOH and TBAOH may be approximately TMA+/H+, TBA+/H+=0.1~50. After the stirring process is completed, the mixture is subjected to a centrifugation process. The centrifugation may be performed for 30 minutes at 2,000 rotations per minute (rpm), at room temperature. Through the centrifugation process, an aqueous solution including exfoliated $RuO_{(2+x)}$ nano-sheets and a precipitate including un-exfoliated powder are separated from one another. FIG. 4 is a scanning electron microscope (SEM) image of an exfoliated $RuO_{(2+x)}$ ($0 \leq x \leq 0.1$) nano-sheet prepared using a method of manufacturing a heating element according to an exemplary embodiment. In FIG. 4, reference numerals 50 and 52 respectively indicate a substrate and a $RuO_{(2+x)}$ nano-sheet. The exfoliated $RuO_{(2+x)}$ nano-sheets obtained by the centrifugation step may include $RuO_2$ nano-sheets (x=0) and $RuO_{2.1}$ nano-sheets (x=0.1). For convenience sake, hereinafter, an $RuO_{(2+x)}$ nano-sheet is referred as an $RuO_2$ nano-sheet.

The concentration of the exfoliated $RuO_2$ nano-sheet in the aqueous solution obtained through the centrifugation step is measured using Ultraviolet-Visible Spectrophotometer (UVS).

The optical absorbency of the $RuO_2$ nano-sheet aqueous solution with respect a wavelength of 350 nm is measured, and the concentration (grams per liter, g/L) of the $RuO_2$ nano-sheet in the $RuO_2$ nano-sheet aqueous solution is calculated using an absorbency coefficient (7400 L/mol.cm) of the $RuO_2$ nano-sheet.

Next, a volume of the $RuO_2$ nano-sheet aqueous solution is measured which corresponds to a desired weight of $RuO_2$ nano-sheet, and a solvent (in this example, water) is removed from the measured volume of the $RuO_2$ nano-sheet aqueous solution using a centrifugal separator. At this point, the centrifugal separator may be operated at a speed of 10,000 rpm or above for 15 minutes or more.

2) Manufacture Heating Element

A matrix material is mixed with the resultant product from which the solvent of the $RuO_2$ nano-sheet aqueous solution is removed (S2). The amount of matrix material may be added so that the weight content of the $RuO_2$ nano-sheet is at a set value (for example, 10 weight percent (wt %)). The amount of matrix material to be added thus may vary according to the desired weight content of the $RuO_2$ nano-sheet of the set value.

In the current embodiment of a method of manufacturing a heating element, an oxide glass may be used as a matrix material. The oxide glass may include at least one of silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, and sodium oxide.

Next, a mixture of the $RuO_2$ nano-sheets and the matrix material is coated on a substrate (S3).

The substrate may have a composition which is the same as or different from the composition of the matrix material, and may be a silicon wafer or a metal substrate. The coating of the mixture on the substrate may be performed by a method which includes at least one of a screen printing method, an ink jet method, a dip coating method, a spin coating method, and a spray coating method.

After coating is completed, the coated product is dried at a temperature in a range from about 100° C. to about 200° C. in order to remove any residual solvent from the coated product (S4). In other embodiments, the coated product may be dried at a temperature in a range from about 85° C. to about 250° C., or from about 110° C. to about 150° C.

Next, the coated product from which the solvent is removed is heat treated at a temperature in a range from about 500° C. to about 1000° C., or from about 500° C. to about 900° C., or from about 550° C. to about 800° C., for a time period of 1 minute to 20 minutes, or from 1 minute to 15 minutes, or from 1 minute to 10 minutes (S5). For example, the coated product may be heat treated at 600° C. for 2 minutes. As a result, the $RuO_2$ nano-sheets are sintered.

In this manner, a heating element including a nanomaterial is manufactured.

Figure 5:
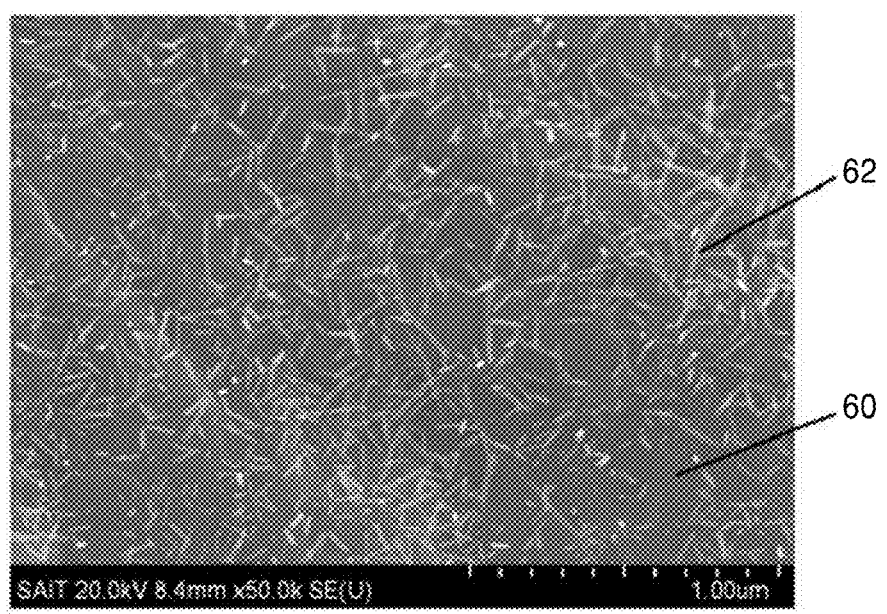
FIG. 5 is a SEM image of a heating element including a matrix material and a nanomaterial filler, and formed by a method of manufacturing a heating element according to an embodiment.

FIG. 5 is a SEM image of a heating element formed by a method of manufacturing a heating element according to an exemplary embodiment. In FIG. 5, reference numeral 60 indicates a matrix material (for example, glass frit) and reference numeral 62 indicates a nanomaterial filler (for example, $RuO_2$ nano-sheet).

Referring to FIG. 5, the nanomaterial filler 62 is uniformly distributed in the matrix material 60.

Meanwhile, a nanomaterial filler including a chalcogenide nano-sheet, a boride nano-sheet, or a carbide nano-sheet may be manufactured as follows.

A chalcogenide nano-sheet may be manufactured as follows. Raw materials in a solid powder state are prepared. At this point, the raw materials are prepared by weighing appropriate amounts to obtain a desired atomic ratio. Next, the prepared raw materials are uniformly mixed, and afterwards, are made into pellets. After placing the pellets in a quartz tube, the quartz tube is filled with an argon gas and is sealed. The quartz tube in which the pellets are placed is heat treated in a furnace at a temperature in a range from about 500° C. to about 1300° C., or from about 600° C. to about 1200° C., or from about 700° C. to about 1150° C., for in a range from about 12 hours to about 72 hours, or from about 12 hours to about 48 hours, or from about 12 hours to about 24 hours, or from about 24 hours to about 72 hours. After the heat treatment, the resultant product is cooled to room temperature, and afterwards, the pellets are removed from the quartz tube and are ground into a powder, thereby gaining the pellets in a powder state. Lithium ions are injected between the chalcogenide layers which are in a powder state. The lithium ions may be injected between the chalcogenide layers which are in a powder state using a lithium ion source, for example, an organolithium such as n-butyllithium.

As another example, instead of using a lithium ion source, lithium ions may be directly injected between the chalcogenide layers which are in a powder state using an electrochemical method.

When lithium ions are injected between the chalcogenide layers formed in a powder state, the space between the individual chalcogenide layers is increased, and thus, the chalcogenide layers, that is, chalcogenide nano-sheets may be exfoliated. When the lithium ions are replaced by molecules having a larger size (for example, water molecules or organic molecules), the spaces between the chalcogenide layers may further be increased. Accordingly, chalcogenide nano-sheets may be more easily exfoliated.

As another method of easily exfoliating chalcogenide nano-sheets, after injecting lithium ions between the chalcogenide layers formed in a powder state, the chalcogenide layers may be ultrasonicated.

Boride nano-sheets may be manufactured by the following two methods.

The first method is the same method as the method of manufacturing chalcogenide nano-sheets.

The second method is as follows.

Raw materials in a solid powder state are prepared. At this point, the raw materials are prepared by weighing appropriate amounts to obtain a desired atomic ratio. Next, the prepared raw materials are uniformly mixed, and afterwards, are made into pellets. After placing the pellets in an arc melting equipment, the pellets are melted at a high temperature using an electric arc. The melting process using an electric arc may be repeated a few times until the pellets are uniformly mixed to become a single phase. After the resultant product is cooled down to room temperature, the resultant product is removed from the arc melting equipment and is ground, thereby gaining the pellets in a powder state. Afterwards, lithium ions are injected between individual boride layers which are in a powder state. The lithium ions may be injected between the boride layers formed in a powder state using a lithium ion source, for example, an organolithium such as n-butyllithium. Instead of using a lithium ion source, lithium ions may be directly injected between the boride layers which are in a powder state using an electrochemical method. When lithium ions are injected between the boride layers which are in a powder state, spaces between the boride layers which are in a powder state may be increased, and thus, the boride layers, that is, boride nano-sheets, may be easily exfoliated. When the lithium ions are replaced by molecules having a larger size (for example, water molecules or organic molecules), the spaces between the boride layers may further be increased. Accordingly, the boride nano-sheets may be easily exfoliated.

After injecting lithium ions between the boride layers which are in a powder state, the boride nano-sheets may be exfoliated by ultrasonicating the boride layers.

Carbide nano-sheets may be manufactured using the same method used to manufacture the boride nano-sheets.

3) Electrical Conductivity Measurement

After applying an Ag paste on both edges of the formed heating element, two electrodes are formed by drying the Ag paste. A resistance between the two electrodes is measured, and an electrical conductivity of the heating element is measured by measuring lengths of a horizontal, vertical, and thickness of a heating element. In the case of the heating element including a nanomaterial filler including $RuO_2$ nano-sheets, manufactured by the method described above, the measured electrical conductivity is approximately 1,358 S/m.

A comparison of a heating element according to the comparative example with the heating element prepared according to the embodiment described above, is described below.

In detail, the comparative example of a heating element is manufactured using $RuO_2$ particles having an aspect ratio of 2 or less, and an average particle size of 200 nm. In order to compare the heating element including the $RuO_2$ nano-sheets according to the current embodiment, the comparative heating element is manufactured by mixing 10 wt % $RuO_2$ particles and a glass frit, and a heat treatment for sintering is performed at a temperature of 700° C. for 5 minutes. The electrical conductivity of the comparative heating element is measured as 2.93 S/m.

Generally, if a sintering temperature is high and the time for heat treatment is long, $RuO_2$ is sintered well, and thus, the electrical conductivity of the heating element is high.

However, in the case of the heating element prepared according to the current embodiment described above (e.g. $RuO_2$ nano-sheets), although the sintering temperature is lower and the sintering time is relatively shorter as compared to the comparative heating element, the electrical conductivity of the heating element prepared according to the current embodiment is 300 times or more higher than the electrical conductivity of the comparative heating element.

Without being limited by theory, it is believed that one of the reasons for this outcome may be regarded as that the $RuO_2$ nano-sheets included in the heating element according to the current embodiment are more effective at percolating the matrix material than the $RuO_2$ particles included in the comparative heating element.

Figure 6A:
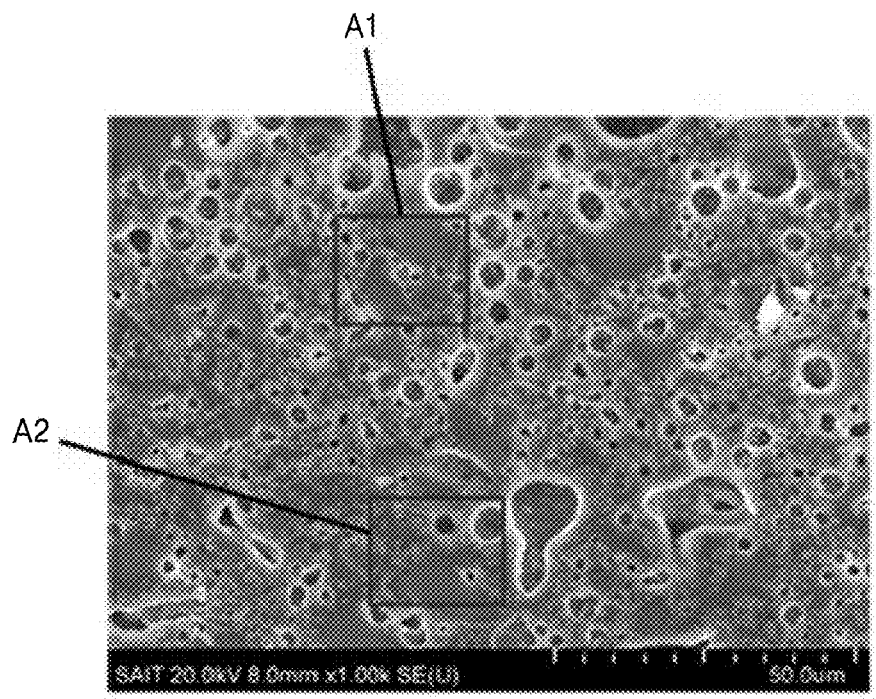
FIGS. 6A, 6B, and 6C are SEM images of comparative heating elements.
Figure 6B:
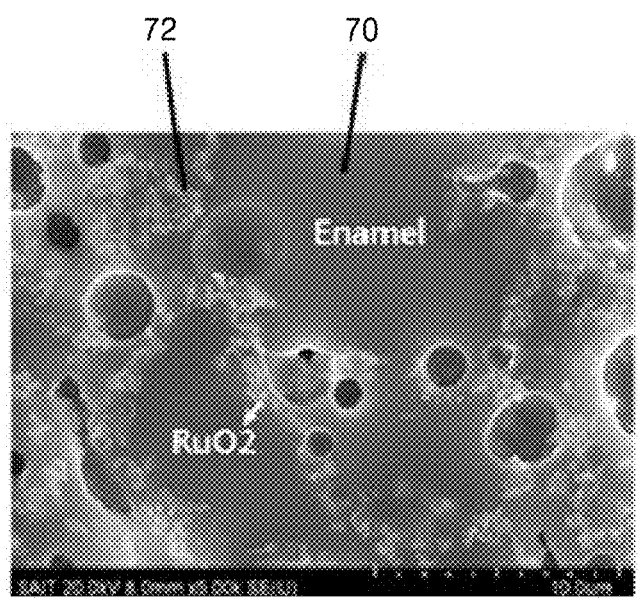
Figure 6C:
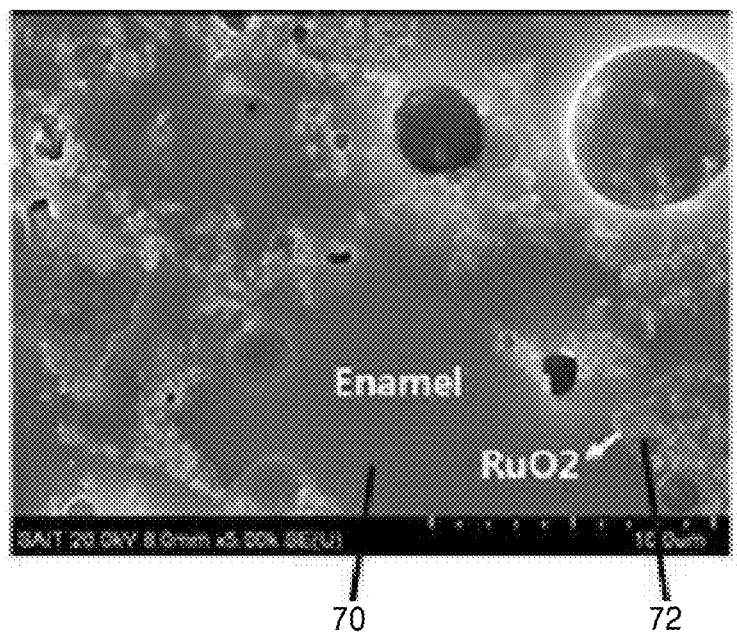

FIGS. 6A, 6B, and 6C are SEM images of a heating element according to the comparative example.

FIGS. 6B and 6C are respectively magnified photographs of a first region A1 and a second region A2 in FIG. 6A. In FIGS. 6B and 6C, reference numeral 70 indicates a glass frit (for example, enamel), and reference numeral 72 indicates $RuO_2$ particles.

Referring to FIG. 6B and FIG. 6C, there are some regions in the glass frit 70 where the $RuO_2$ particles are not present. Due to these regions, the percolation network of the $RuO_2$ particles may be weakened, and thus, the electrical conductivity of the comparative heating element is reduced.

Through this outcome, it may be seen that, as in the heating element according to the current embodiment, if a nanomaterial (for example, nano-sheets or nano-rods) is used as filler, the sintering temperature may be reduced as compared to the comparative heating element, and, if the content of the filler is equal, the electrical conductivity of the heating element is increased.

Next, a relationship between the electrical conductivity of the heating element according to the current embodiment and the electrical conductivity of a nanomaterial filler included in the heating element will be described. Through this relationship, the electrical conductivity of the nanomaterial filler, in other words, a nanomaterial that may be used as filler for the heating element to obtain heat, may be selected.

In detail, in order to calculate the properties of a nanomaterial (for example, a nano-sheet) that may be used as filler in the heating element according to the current embodiment, a desired electrical conductivity for the heating element according to the current embodiment is calculated.

When external energy, for example, power supplied to heat the heating element according to the current embodiment is in a range from about 500 watts (W) to about 1,000 W, an area of a sheet type heating element is in a range from about 0.01 square meter ($m^2$) to about 1 $m^2$, and a thickness of the sheet type heating element is in a range from about 10 μm to about 1,000 μm. Accordingly, the electrical conductivity of the heating element according to the current embodiment may be in a range from about 50 S/m to about 500 S/m.

Electrical conductivity needed of the nanomaterial (for example, a nano-sheet) used as filler in the heating element according to the current embodiment may be calculated by Equation 1 below.

$$\sigma c = \sigma f \times Vf \times (Af/Am) \times (Sf/Lf) \quad \text{Equation 1}$$

In Equation 1, σc indicates electrical conductivity of a heating element, and σf indicates electrical conductivity of a filler. Vf indicates a volume fraction of the filler, Af indicates a dispersion area of the filler, Am indicates an area of a matrix (a glass frit or an organic polymer), Sf indicates a sintered area (or a length of a sintered portion) of the filler, and Lf indicates a total area of the filler (or a total length of the filler). Af/Am indicates a degree of dispersion of the filler. When the filler is dispersed on the whole area of the matrix, the degree of dispersion of the filler is 1. Sf/Lf indicates a degree of sintering of the filler.

Figure 7:
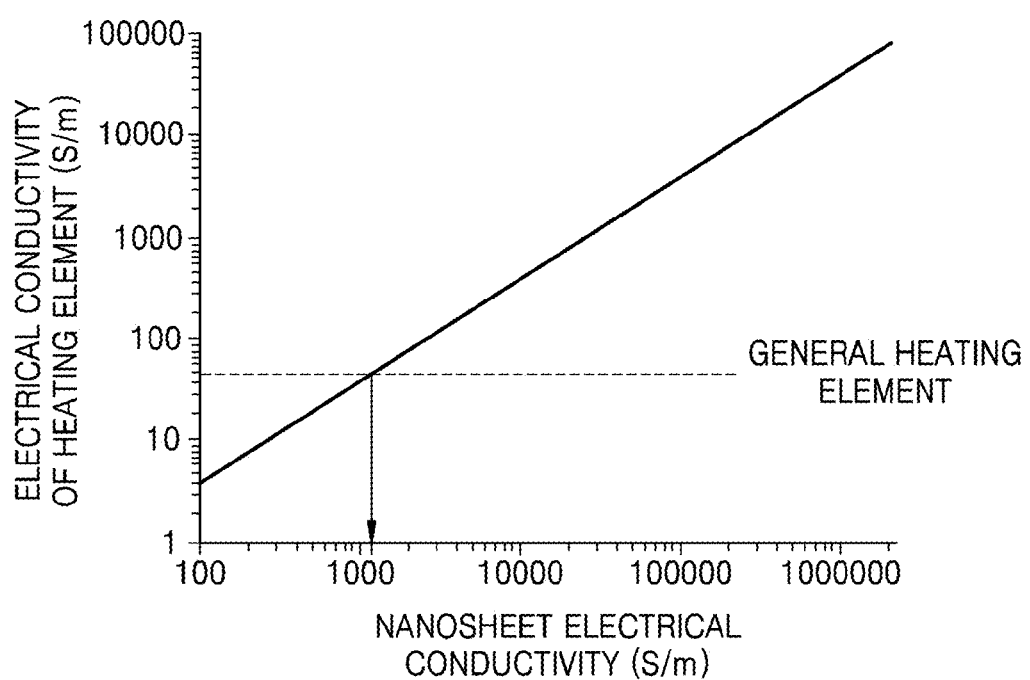
FIG. 7 is a graph of electrical conductivity of a heating element (Siemens per meter, S/m) versus electrical conductivity of a nanomaterial filler (S/m) when a degree of nanomaterial filler dispersion and a degree of sintering respectively are 1 (100%) and a volume fraction of the filler is 10 volume percent (vol %)

Assuming that the degree of dispersion of the filler and the degree of the sintering of the filler respectively are 1 (100%) and the volume fraction of the filler is 10 vol %, the relationship between the electrical conductivity of the heating element and the electrical conductivity of the filler may be expressed as a graph of FIG. 7.

Referring to the graph of FIG. 7, when an electrical conductivity for the heating element is approximately 50 S/m, the electrical conductivity of the nanomaterial used as filler is approximately 1,250 S/m. Also, when the electrical conductivity of the heating element is approximately 500 S/m, the electrical conductivity of the nanomaterial used as the filler may be approximately 12,500 S/m.

A material that may be used as filler for the heating element according to the current exemplary embodiment may be, for example, at least one of an oxide, a boride, a carbide, or a chalcogenide. Of these materials, the materials having an electrical conductivity greater than 1,250 S/m are listed in Tables 1 through 3 below.

TABLE 1

Oxide for filler material.

| Composition | $\sigma_f$ (S/m) | Composition | $\sigma_f$ (S/m) |
|---|---|---|---|
| $RuO_2$ | $3.55 \times 10^6$ | $NbO_2$ | $3.82 \times 10^6$ |
| $MnO_2$ | $1.95 \times 10^6$ | $WO_2$ | $5.32 \times 10^6$ |
| $ReO_2$ | $1.00 \times 10^7$ | $GaO_2$ | $2.11 \times 10^6$ |
| $VO_2$ | $3.07 \times 10^6$ | $MoO_2$ | $4.42 \times 10^6$ |
| $OsO_2$ | $6.70 \times 10^6$ | $InO_2$ | $2.24 \times 10^6$ |
| $TaO_2$ | $4.85 \times 10^6$ | $CrO_2$ | $1.51 \times 10^6$ |
| $IrO_2$ | $3.85 \times 10^6$ | $RhO_2$ | $3.10 \times 10^6$ |

TABLE 2

Borides and Carbides for filler material.

| Items | composition | $\sigma_f$ (S/m) |
|---|---|---|
| Boride | $Ta_3B_4$ | 2335000 |
|  | $Nb_3B_4$ | 3402000 |
|  | $TaB$ | 1528800 |
|  | $NbB$ | 5425100 |
|  | $V_3B_4$ | 2495900 |
|  | $VB$ | 3183200 |
| Carbide | $Dy_2C$ | 180000 |
|  | $Ho_2C$ | 72000 |

TABLE 3

Chalcogenides for filler material.

| Composition | $\sigma_f$ (S/m) | composition | $\sigma_f$ (S/m) |
|---|---|---|---|
| $AuTe_2$ | 433000 | $TiSe_2$ | 114200 |
| $PdTe_2$ | 3436700 | $TiTe_2$ | 1055600 |
| $PtTe_2$ | 2098000 | $ZrTe_2$ | 350500 |
| $YTe_3$ | 985100 | $HfTe_2$ | 268500 |
| $CuTe_2$ | 523300 | $TaSe_2$ | 299900 |
| $NiTe_2$ | 2353500 | $TaTe_2$ | 444700 |
| $IrTe_2$ | 1386200 | $TiS_2$ | 72300 |
| $PrTe_3$ | 669000 | $NbS_2$ | 159100 |
| $NdTe_3$ | 680400 | $TaS_2$ | 81000 |
| $SmTe_3$ | 917900 | $Hf_3Te_2$ | 962400 |
| $GdTe_3$ | 731700 | $VSe_2$ | 364100 |
| $TbTe_3$ | 350000 | $VTe_2$ | 238000 |
| $DyTe_3$ | 844700 | $NbTe_2$ | 600200 |
| $HoTe_3$ | 842000 | $LaTe_2$ | 116000 |
| $ErTe_3$ | 980100 | $LaTe_3$ | 354600 |
| $CeTe_3$ | 729800 | $CeTe_2$ | 55200 |

Next, an apparatus including a heating element according to an embodiment will be described with reference to the drawings.

Since the heating element according to the current embodiment may be used as a heat source that generates heat, the heating element may be used in an apparatus that utilizes a heat source and may be used as a heat generation part or as an electronic element. For example, the heating element described above may be used for a printer, for example, a fuser for a printer. Also, the heating element described above may be applied to a thin film resistor or a thick film resistor.

Figure 8:
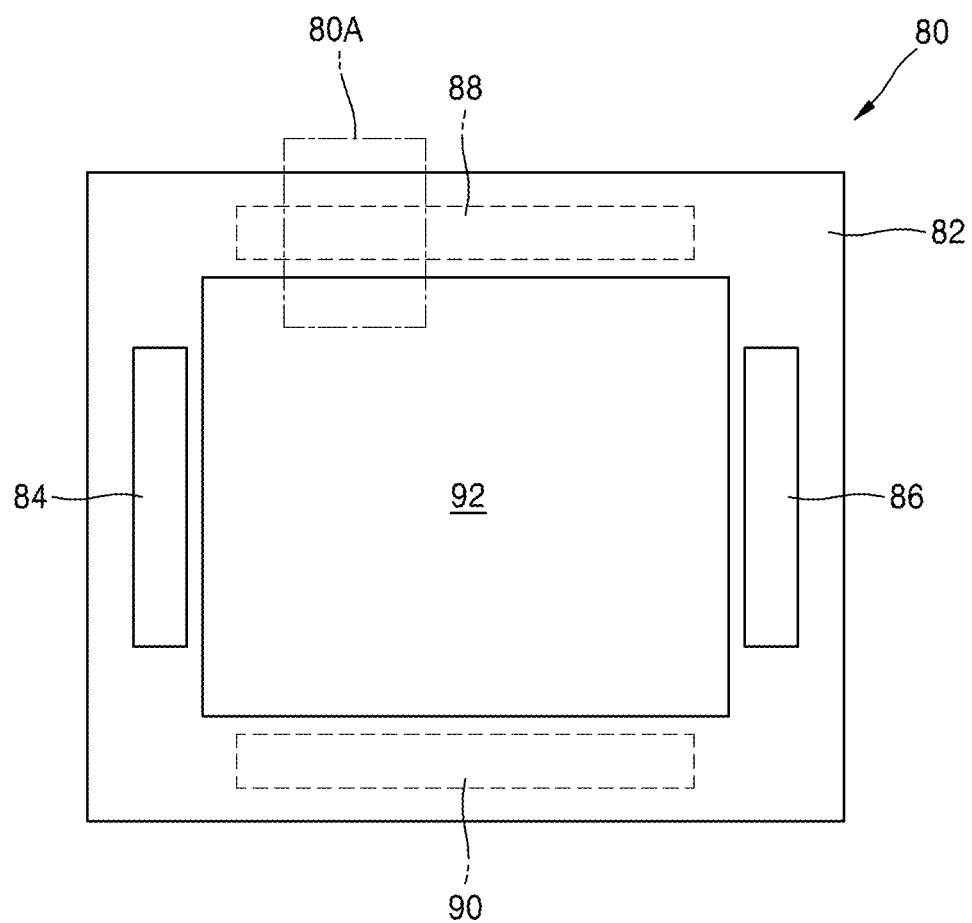
FIG. 8 is a cross-sectional view of an apparatus including a heating element according to an embodiment.

FIG. 8 is a cross-sectional view of an apparatus 80 including a heating element according to an embodiment as a heat source.

Referring to FIG. 8, the apparatus 80 includes a main body 82 and a first heating element 84 included in the main body 82. The apparatus 80 may be an electrical apparatus or an electronic apparatus, for example, an oven. The main body 82 of the apparatus 80 may include an inner space 92 for accommodating, for example, a food. When the apparatus 80 is operated, energy (for example, heat) may be supplied to warm up a material in the inner space 92 or to increase a temperature of the inner space 92. The first heating element 84 may be arranged so that heat generated from the first heating element 84 is distributed towards the inner space 92. The first heating element 84 may be the heating element or the heating element module as described with reference to FIGS. 1 and 2, and may be the heating element manufactured according to the method described with reference to FIG. 3. A second heating element 86 facing the first heating element 84 may further be provided in the main body 82, and the second heating element 86, like the first heating element 84, may also be arranged so that heat generated from the second heating element 86 is distributed towards the inner space 92. The second heating element 86 may be the heating element or the heating element module as described with reference to FIGS. 1 and 2, and may be the heating element manufactured according to the method described with reference to FIG. 3. The first and the second heating elements 84 and 86 may be the same heating elements or they may be heating elements which are different from each other. Also, as indicated by the dotted lines, a third heating element 88 and a fourth heating element 90 may further be provided in the main body 82, or only one of the third and fourth heating elements 88 and 90 may be provided.

According to another embodiment, only the third and fourth heating element 88 and 90 may be provided in the main body 82. At least one of an adiabatic member or a thermal reflection member may be arranged on a side of the heating element, for example, between external boundary surfaces of the main body 82 and each of the first through fourth heating elements 84, 86, 88, and 90.

The first through fourth heating elements 84, 86, 88, and 90 may be sheet heating elements having a two-dimensional area.

Figure 9:
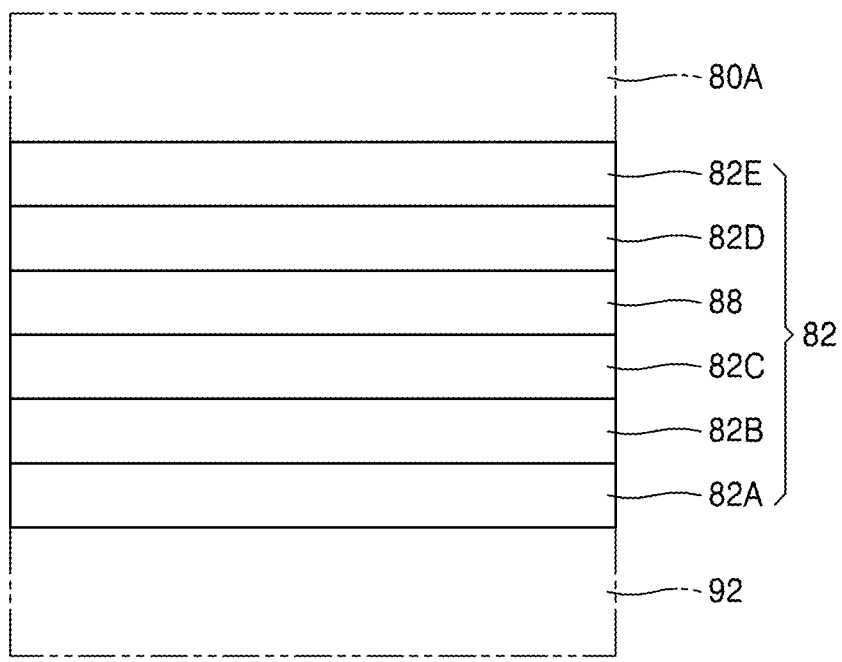
FIG. 9 is a magnified cross-sectional view of a first region 80A of FIG. 8.

FIG. 9 is a magnified cross-sectional view of a first region 80A of FIG. 8.

Referring to FIG. 9, in the main body 82, an adiabatic material 82D and a case 82E are sequentially formed between the third heating element 88 and an external region. The case 82E may be an external case of the apparatus 80. The adiabatic material 82D arranged between the case 82E and the third heating element 88 may extend to regions of the first, second, and fourth heating elements 84, 86, and 90 arranged on the main body 82. The adiabatic material 82D is disposed to prevent heat generated by the third heating element 88 from being discharged to the outside of the apparatus 80. The adiabatic material 82D may be replaced with a thermal reflection member.

A second insulating layer 82C, a substrate 82B, and a first insulating layer 82A are formed between the third heating element 88 and the inner space 92. The first insulating layer 82A, the substrate 82B, the second insulating layer 82C, and the third heating element 88 are sequentially stacked from the inner space 92 towards the outside of the apparatus 80. This layer configuration may also be applied to the regions where the first, second, and fourth heating elements 84, 86, and 90 are arranged.

The first and second insulating layers 82A and 82C may include the same insulating material or a different insulating material from each other. At least one of the first and second insulating layers 82A and 82C may be an enamel layer, but the current embodiment is not limited thereto. Also, thicknesses of the first and second insulating layers 82A and 82C may be the same or different from each other. The substrate 82B may be a supporting member that maintains a structure of the main body 82 of the apparatus 80 while supporting the first through fourth heating elements 84, 86, 88, and 90. The substrate 82B may be, for example, a metal plate, but the current embodiment is not limited thereto. As depicted in FIG. 9, a stacking structure that includes the third heating element 88 may be applied to other types of apparatus (for example, an electric pot) for heating a material (for example, water) in addition to the apparatus 80 of FIG. 8. When the third heating element 88 is disposed on a bottom side and a material that absorbs heat is disposed on the third heating element 88, the adiabatic material 82D may be disposed under the third heating element 88.

Figure 10A:
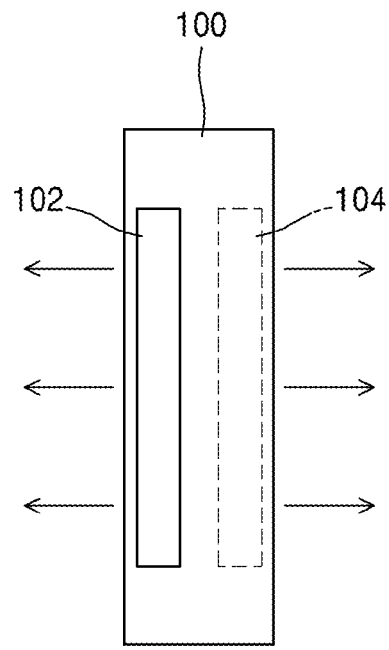
FIGS. 10A and 10B are cross-sectional views of an apparatus including a heating element according to another embodiment.
Figure 10B:
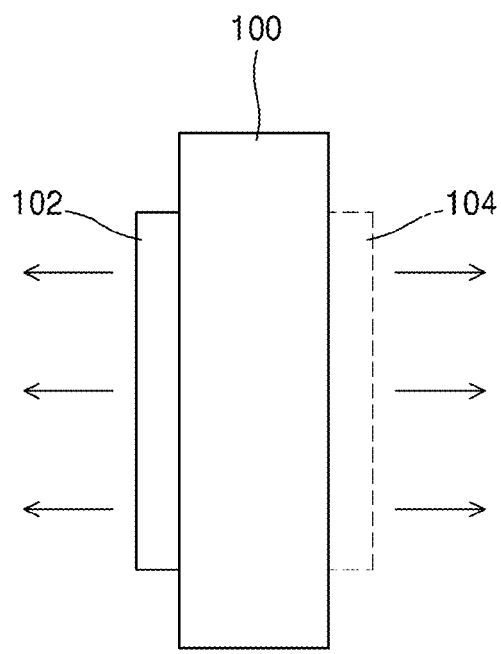

FIGS. 10A and 10B are cross-sectional views of an apparatus including a heating element according to another embodiment. The apparatus of FIGS. 10A and 10B may be a heating apparatus.

Referring to FIG. 10A, a first apparatus 102 is disposed inside a wall 100. The first apparatus 102 may be a heat generation apparatus configured to discharge heat towards an outside of (e.g. external to) a first surface of the wall 100. If the wall 100 is at least one of the walls that define a room, the first apparatus 102 may be a heat generation apparatus that discharges heat to increase a temperature of the room or to warm up the room. As shown in FIG. 10B, the first apparatus 102 may be arranged on an outer surface of the wall 100.

Although not shown, the first apparatus 102 may be installed apart from the wall 100. When the first apparatus 102 is installed apart from the wall 100, the first apparatus 102 may be freely moved. Accordingly, a user may move the first apparatus 102 to an area desired by the user.

The first apparatus 102 may include a heating element (not shown) for generating heat therein. The heating element may be the heating element or the heating element module described with reference to FIGS. 1 and 2, and may be the heating element manufactured according to the method described with reference to FIG. 3. The whole of the first apparatus 102 may be buried in the wall 100. However, a panel for operating the first apparatus 102 may be disposed on a surface of the wall 100. A second apparatus 104 may further be included inside the wall 100. The second apparatus 104 may be a heat generation apparatus configured to discharge heat towards an outside (e.g. external to) a second surface of the wall 100. If the wall 100 is at least one of the walls that define a room, the second apparatus 104 may be an apparatus that discharges heat to heat up an adjacent room or another region neighboring the room with the wall 100 therebetween. The second apparatus 104, as shown in FIG. 10B, may also be installed on a surface of the wall 100. Although not shown, the second apparatus 104, like the first apparatus 102, may also be freely moved apart from the wall 100. The second surface may be a surface opposite to the first surface or facing the first surface. The second apparatus 104 may include a heating element (not shown) that generates heat. The heating element may be a heat source for increasing a temperature outside of (e.g. external to) the second surface. At this point, the heating element may be the heating element or the heating element module described with reference to FIGS. 1 and 2 and the heating element may be manufactured using the method described with reference to FIG. 3. Most parts of the second apparatus 104 may be buried inside the wall 100. However, a panel for operating the second apparatus 104 may be disposed on a surface of the wall 100. In FIGS. 10A and 10B, arrows indicate directions of discharging heat generated from the first and second apparatuses 102 and 104.

The first and second apparatuses 102 and 104 respectively may have attachable/detachable structures. In this case, one of the first and second apparatuses 102 and 104 may be mounted on an inner side of a window. For example, assuming that reference numeral 100 of FIG. 10B indicates not a wall but a window, the first apparatus 102 may be a heat generation apparatus mounted on an inner side of the window. In this case, the second apparatus 104 may not be needed. When the first apparatus 102 is mounted on the window, the first apparatus 102 may be mounted on a whole inner surface of the window or may be mounted on only a part of an inner surface of the window.

According to an embodiment, the heating element described above may be applied to a device or an apparatus that provides heat to a user. For example, the heating element may be applied to a hot pack or to clothes (for example, a jacket or a vest, gloves, or shoes, etc.) that may be worn by the user. The heating element described above may be provided on an inner side or inside a cloth.

Also, according to another embodiment, the heating element according to the current embodiment may be applied to a wearable device. The heating element described above may also be applied to outdoor equipment, that is, may be applied to an apparatus that emits heat in a cold atmosphere.

The heating element according to various embodiments may include a matrix material and nanomaterial filler (for example, nano-sheets or nano-rods). Accordingly, the nanomaterial filler may be more easily percolated into the matrix material as compared to a particulate filler. Also, when nanomaterial filler according to the disclosed embodiments is used, a surface of a matrix material may be covered with a smaller amount of the filler as compared to the particulate filler. Thus, when the same amount of nanomaterial filler is used in the heating element, the electrical conductivity may be increased as compared to a heating element including a particulate filler. Also, in the case of the disclosed nanomaterial filler, since the nanomaterials have a surface contact, sinterability is increased, and thus, a sintering temperature may be reduced. Accordingly, the method of manufacturing a heating element according to the current embodiment may be performed at a lower temperature as compared to the method of manufacturing a heating element using a particulate filler.

It will be understood by those of ordinary skill in the art that the inventive concept is not limited to the technical contents described above but should be construed as exemplary embodiments. Therefore, the technical scope of the inventive concept may be defined not by the detailed description of the inventive concept but by the technical scope of the appended claims.

What is claimed is:
1. A heating element comprising:
a matrix material; and
a nanomaterial filler,
wherein the heating element comprises a mixture of the nanomaterial filler and the matrix material, and
wherein the nanomaterial filler is an oxide, a boride, a carbide, a chalcogenide, or a combination thereof, and has a shape of at least one of a nanosheet and a nanorod.
2. The heating element of claim 1, wherein the matrix material comprises at least one of a glass frit and an organic polymer.
3. The heating element of claim 2, wherein the glass frit comprises at least one of silicon oxide, lithium oxide, nickel oxide, cobalt oxide, boron oxide, potassium oxide, aluminum oxide, titanium oxide, manganese oxide, copper oxide, zirconium oxide, phosphorus oxide, zinc oxide, bismuth oxide, lead oxide, and sodium oxide.

4. The heating element of claim 2, wherein the glass frit comprises silicon oxide and at least one additive, wherein the additive comprises at least one of Li, Ni, Co, B, K, Al, Ti, Mn, Cu, Zr, P, Zn, Bi, Pb, and Na.

5. The heating element of claim 2, wherein the organic polymer comprises at least one of a polyimide, polyphenylene sulfide, polybutylene terephthalate, polyamideimide, liquid crystalline polymer, polyethylene terephthalate, polyetherketone, and polyetheretherketone.

6. The heating element of claim 1, wherein the nanomaterial filler has a thickness in a range from about 1 nanometer to about 1,000 nanometers.

7. The heating element of claim 1, wherein the nanomaterial filler has a length in a range from about 0.1 micrometer to about 500 micrometers.

8. The heating element of claim 1, wherein the content of the nanomaterial filler in the heating element is in a range from about 0.1 volume percent to less than 100 volume percent.

9. The heating element of claim 1, wherein the nanomaterial filler has an electrical conductivity of at least about 1,250 Siemens per meter.

10. The heating element of claim 1, wherein the heating element is in a form of a sheet having a two dimensional area.

11. The heating element of claim 1, wherein the oxide comprises at least one of $RuO_2$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, and $RhO_2$.

12. The heating element of claim 1, wherein the boride comprises at least one of $Ta_3B_4$, $Nb_3B_4$, $TaB$, $NbB$, $V_3B_4$, and $VB$.

13. The heating element of claim 1, wherein the carbide comprises at least one of $Dy_2C$ and $Ho_2C$.

14. The heating element of claim 1, wherein the chalcogenide comprises at least one of $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe^3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, and $CeTe_2$.

15. A method of manufacturing a heating element, the method comprising:
  mixing a nanomaterial filler with a matrix material to form a mixture of the nanomaterial filler and the matrix material;
  coating the mixture of the nanomaterial filler and the matrix material on a substrate to form a coating on the substrate; and
  heat treating the coating on the substrate to provide the heating element,
  wherein the nanomaterial filler comprises is an oxide, a boride, a carbide, a chalcogenide, or a combination thereof, and has a shape of at least one of a nano-sheet and a nano-rod, and
  wherein, in the heating element, the heating element comprises a mixture of the nanomaterial filler and the matrix material.

16. The method of claim 15, further comprising manufacturing the nanomaterial filler, wherein the manufacturing comprises:
  forming a solution comprising a nanomaterial and a solvent;
  calculating a concentration of the nanomaterial in the aqueous solution;
  measuring a volume of the aqueous solution so that the aqueous solution includes a desired weight of the nanomaterial; and
  separating nanomaterial from the measured nanomaterial aqueous solution to provide the nanomaterial filler.

17. The method of claim 15, wherein the heat treating of the coating on the substrate comprises:
  drying the coating on the substrate; and
  sintering the dried resultant product.

18. The method of claim 15, wherein the substrate has a composition that is the same as or different from a composition of the matrix material.

19. The method of claim 15, wherein the substrate is a silicon wafer or a metal substrate.

20. The method of claim 15, wherein the coating comprises at least one of a screen printing method, an ink jet method, a dip coating method, a spin coating method, and a spray coating method.

21. The method of claim 15, wherein the nanomaterial has a thickness in a range from about 1 nanometer to about 1,000 nanometers.

22. The method of claim 15, wherein a content of the nanomaterial is in a range from about 0.1 volume percent to less than about 100 volume percent of the heating element.

23. An apparatus comprising the heating element of claim 1.

24. The apparatus of claim 23, further comprising at least one of an adiabatic member and a thermal reflection member on a side of the heating element.

25. The apparatus of claim 23, wherein the heating element is disposed to supply heat to a region inside the apparatus.

26. The apparatus of claim 23, wherein the heating element is disposed to supply heat to a region on an outside of the apparatus.

27. The apparatus of claim 23, wherein the apparatus is an oven having an inner space configured to receive a food.

28. The apparatus of claim 23, wherein the heating element is in a form of a sheet heating element having a two dimensional area.

* * * * *